(12) United States Patent  (10) Patent No.: US 8,434,574 B1
York et al.  (45) Date of Patent: May 7, 2013

(54) WIND PROPULSION POWER SYSTEM

(75) Inventors: Edward James York, Goldsboro, NC (US); Spencer Jay York, Peoriz, AZ (US); Edward Julius York, Goldsboro, NC (US)

(73) Assignee: York Industries, Inc., Goldsboro, NC (US)

( * ) Notice: Subject to any disclaimer, the term of this patent is extended or adjusted under 35 U.S.C. 154(b) by 301 days.

(21) Appl. No.: 12/757,766

(22) Filed: Apr. 9, 2010

Related U.S. Application Data

(60) Provisional application No. 61/168,443, filed on Apr. 10, 2009.

(51) Int. Cl.
*B60K 16/00* (2006.01)

(52) U.S. Cl.
USPC ............................. 180/2.2; 180/65.1

(58) Field of Classification Search .............. 180/2.1, 180/2.2, 65.1, 65.31, 165; 290/55
See application file for complete search history.

(56) References Cited

U.S. PATENT DOCUMENTS

| | | | |
|---|---|---|---|
| 3,374,849 A * | 3/1968 | Redman | 180/2.2 |
| 3,556,239 A | 1/1971 | Spahn | |
| 4,229,661 A | 10/1980 | Mead et al. | |
| 4,254,843 A | 3/1981 | Han et al. | |
| 4,423,368 A * | 12/1983 | Bussiere | 322/35 |
| 5,680,032 A | 10/1997 | Pena | |
| 6,127,798 A | 10/2000 | Lansang et al. | |
| 6,138,781 A * | 10/2000 | Hakala | 180/2.2 |
| 6,700,215 B2 | 3/2004 | Wu | |
| 6,777,846 B2 | 8/2004 | Feldner et al. | |
| 6,857,492 B1 * | 2/2005 | Liskey et al. | 180/165 |
| 6,897,575 B1 * | 5/2005 | Yu | 290/44 |
| 7,211,905 B1 | 5/2007 | McDavid, Jr. | |
| 7,357,205 B2 * | 4/2008 | Nishizawa | 180/68.3 |
| 7,434,636 B2 | 10/2008 | Sutherland | |
| 7,445,064 B2 | 11/2008 | Kim et al. | |
| 7,810,589 B2 * | 10/2010 | Frierman | 180/2.2 |
| 2001/0011825 A1 | 8/2001 | de Vega | |
| 2005/0098361 A1 | 5/2005 | Mitchell | |
| 2007/0262584 A1 | 11/2007 | Lu | |
| 2007/0262585 A1 | 11/2007 | Rendell | |
| 2008/0048457 A1 | 2/2008 | Patel et al. | |
| 2008/0077286 A1 | 3/2008 | Oyobe et al. | |
| 2008/0179114 A1 | 7/2008 | Chen | |
| 2008/0185197 A1 | 8/2008 | Nakamura | |
| 2008/0217922 A1 | 9/2008 | Chiu | |
| 2008/0272603 A1 | 11/2008 | Baca et al. | |
| 2008/0283319 A1 | 11/2008 | Putnam | |
| 2008/0315827 A1 | 12/2008 | Massey | |
| 2009/0030712 A1 | 1/2009 | Bogolea et al. | |

FOREIGN PATENT DOCUMENTS

| | | |
|---|---|---|
| DE | 3500143 | 7/1986 |
| JP | 10159652 | 6/1998 |

* cited by examiner

*Primary Examiner* — Katy M Ebner
*Assistant Examiner* — Emma K Frick
(74) *Attorney, Agent, or Firm* — Reed Smith LLP

(57) ABSTRACT

A supplemental wind propulsion power system for a vehicle having at least one battery. The system includes an air intake duct disposed on the vehicle for intercepting turbulent airflow created by the forward motion of the vehicle, an air conduit, an air turbine disposed at the outlet of the air conduit and a generator for supplying electricity to the batteries. The system further includes an air filtration system, an air heating system and grid output terminal to provide a port for supplying supplemental electricity to the electrical grid.

6 Claims, 4 Drawing Sheets

WIND PROPULSION POWER SYSTEM

CROSS-REFERENCE TO RELATED APPLICATION

This application claims the benefit under 35 U.S.C. §119 (e) of the earlier filing date of U.S. Provisional Application Ser. No. 61/168,443 filed on Apr. 10, 2009, the contents of which are hereby incorporated by reference.

FIELD OF INVENTION

This invention relates generally to power systems, and in particular to hybrid vehicle power systems utilizing hydrocarbon engines and wind power charged batteries to power the vehicle and to supply supplemental electricity to an electrical grid.

BACKGROUND OF THE INVENTION

The internal combustion engine is traditionally used to power automotive vehicles. Non-polluting alternatives to traditionally vehicles have become increasingly desirable. Alternatives to traditional automotive vehicles include electric powered vehicles and hybrid electric powered vehicles. Drawbacks to electric powered vehicles include not being able to charge the vehicle while in use and not being able to drive long distances between charges. Typical hybrid electric powered vehicles are limited by the size and electric capacity of the batteries. Additionally, with the increasing costs of electricity to power one's home, alternative or supplemental sources of electricity are desirable. Accordingly, there is both a need for alternative vehicle powers systems and for systems to supplement electricity to a power grid.

SUMMARY OF THE INVENTION

Embodiments of the invention include a supplemental wind propulsion power system for a vehicle having at least one battery. The system includes an air intake duct disposed on the vehicle for intercepting turbulent airflow created by the forward motion of the vehicle, an air conduit, an air turbine disposed at the outlet of the air conduit and a generator for supplying electricity to the batteries. The system further includes an air filtration system, an air heating system and grid output terminal to provide a port for supplying supplemental electricity to the electrical grid.

BRIEF DESCRIPTION OF THE DRAWINGS

Referring now to the drawings, wherein like numerals designate identical or corresponding parts throughout the referred views.

DETAILED DESCRIPTION OF THE INVENTION

Figure 1:
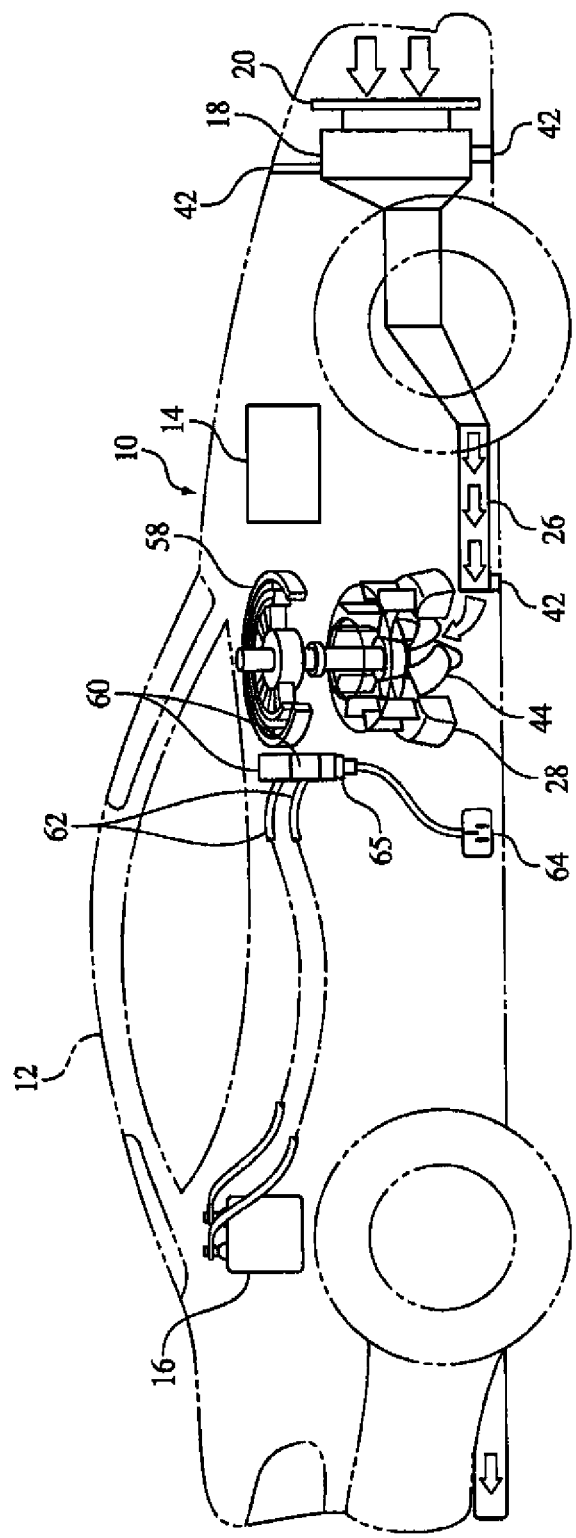
FIG. 1 is a side view of the supplemental wind propulsion power system disposed on an automobile.
Figure 2:
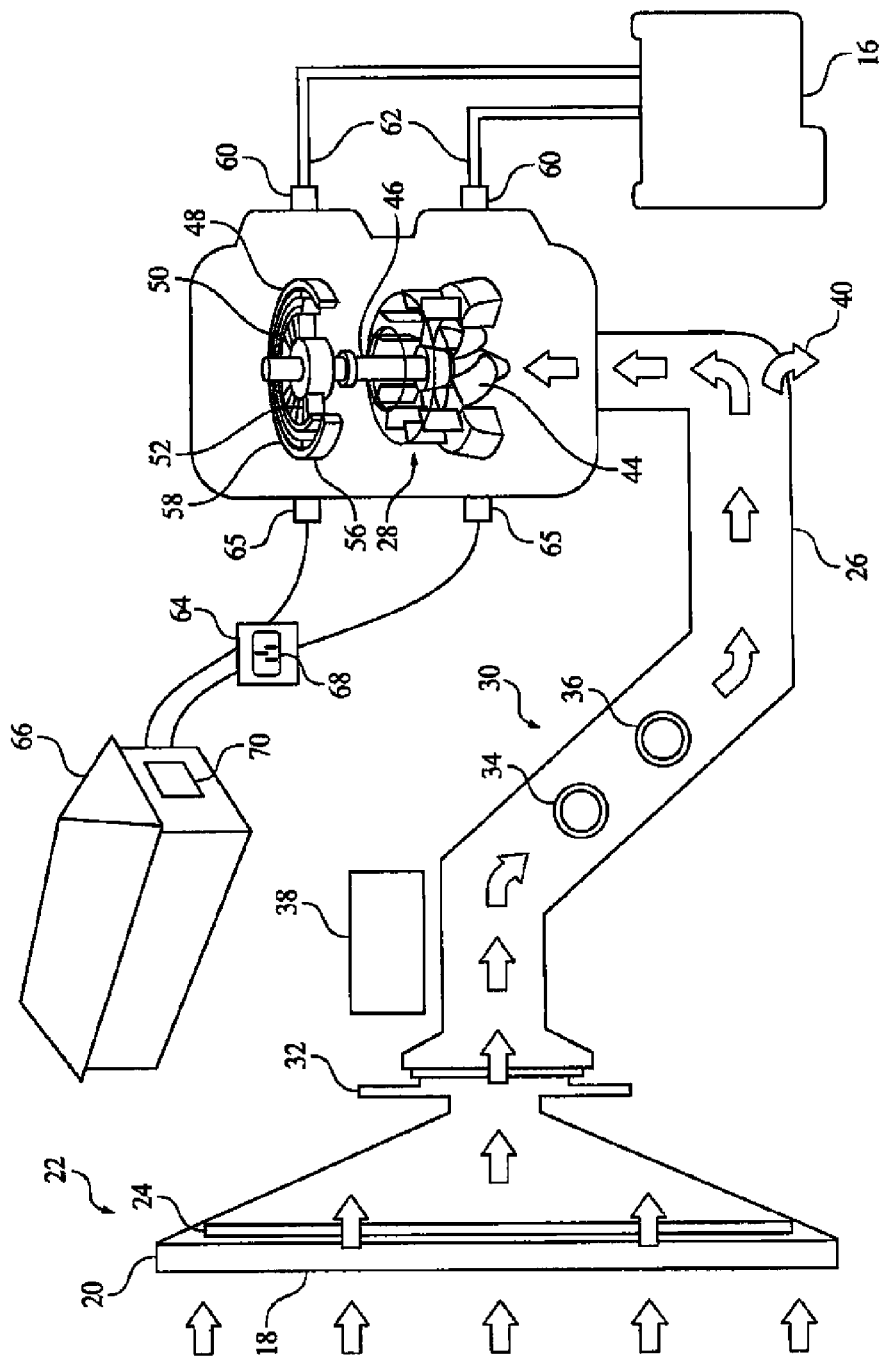
FIG. 2 is drawing of the supplemental wind propulsion power system.
Figure 3:
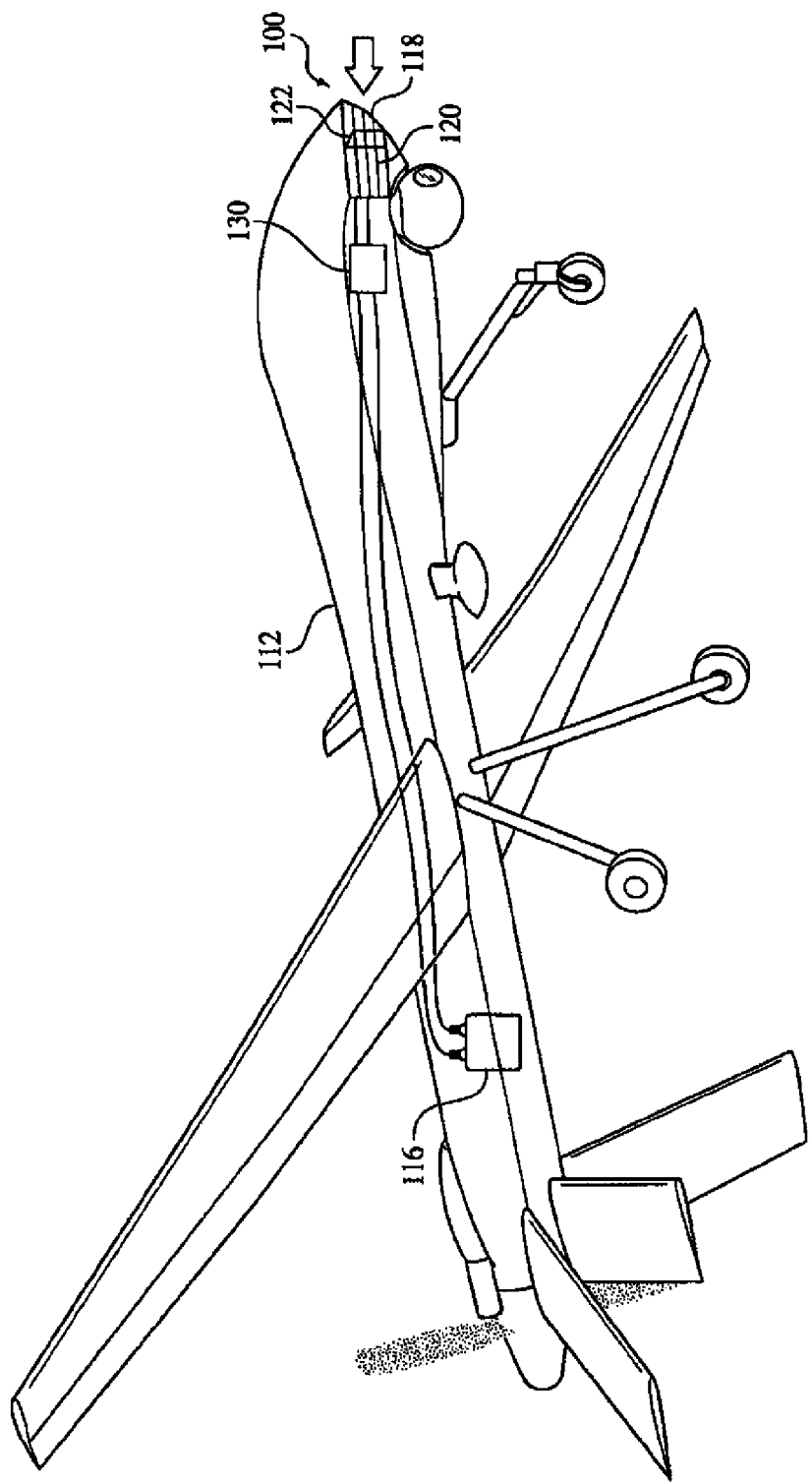
FIG. 3 a side view of the supplemental wind propulsion power system disposed on a drone aircraft.

Embodiments of the disclosed supplemental wind propulsion power system 10 and utilization with a vehicle 12 are shown in FIGS. 1-3. Although the supplemental wind propulsion power system 10 is shown utilizing an automobile, the system 10 is capable of being portable and mounted to or retrofitted on a variety of vehicles capable of generating an appreciable degree of wind turbulence while in motion such as trucks, motorcycles, recreational vehicles, ships, airplanes, jets, drone aircrafts or rail vehicles such as electric high speed bullet trains. For example, a government may retrofit its fleet of aircraft, vehicles and ships with the supplemental wind propulsion power system 10, and use supplemental electricity produced for government power usage. The wind propulsion power system 10 is an environmentally friendly system producing "green" wind generated energy.

Referring to FIG. 1, vehicle 12 preferably includes a hydrocarbon engine 14 in combination with at least one battery 16 such as a lithium ion battery. The wind propulsion power system 10 includes an air intake duct 18 mounted behind or in the radiator grill 20 of the vehicle 12 to partially intercept turbulent airflow created by the forward motion of the vehicle. While the air intake duct 18 is preferably located behind the grill 20 in the forward portion of the vehicle, it is understood that the air intake duct 18 may be located on other portions of the vehicle 12 such as one or both sides, the top or bottom of the vehicle 12.

An air filtration system 22 including an air filter 24 is disposed at the entrance of the air intake duct 18 either within or behind the grill 20 to intercept airborne debris. The air filtration system 22 prevents foreign airborne impediments such as sand, grit, mud, seeds, weeds, feathers, fur or other animal or insect matter from entering the wind power system.

Figure 4:
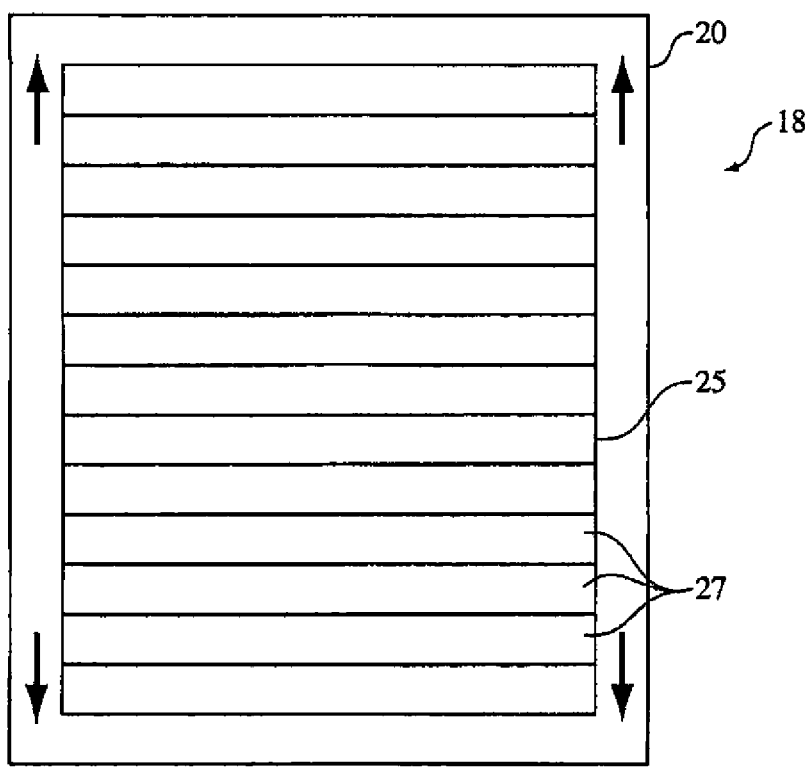
FIG. 4 is a view of the adjustable opening of the air intake duct.

The air intake duct 18 has an adjustable opening 25 including, for example, louvered slats 27 (FIG. 4) allowing for changes in degree of the louvered slats 27 for allowing fluctuation in the volume of air entering the system, thus controlling the quantity of wind generated "green" energy. The louvered slats 27 may be oriented vertically or horizontally. Adjustment allows restricted, controlled air intake at high speed. The adjustable opening also allows closure of the system when batteries are fully charged, or not to be charged, and limited air intake is desired.

Turbulent air flows into the air intake duct 18 and through a penstock or narrowed air conduit 26. Disposed at the end of the narrowed air conduit opposite the air intake duct 18 is an air turbine 28.

The air intake duct 18 and narrowed air conduit 26 preferably include an air heating system 30 (FIG. 2) for heating cold air and removing moisture before entering the turbine 28. The air heating system 30 preferably includes thermostatically controlled heat coils 32 located in the air intake duct 18 and/or battery electrodes 34 or glow plugs 36 within the narrowed air conduit 26 in addition to the vehicle's manifold heater 38. The battery electrodes 34 and glow plugs 36 may be manually activated by the driver while the engine manifold heater 38 may be automatically activated by a built-in thermostat. The air heating 30 system thereby prevents freezing, icy and moist air in frigid regions around the world from negatively affecting the function of the turbine 28. If freezing, moist air were allowed to contact the turbine 28, the turbine may cease to function. An exit port 40, disposed in the narrowed air conduit 26 near the turbine 28, allows water to escape before contacting the turbine 28. The air intake duct and narrowed air conduit 26 are mounted to the vehicle 12 with attachment supports 42.

The turbine 28 includes turbine propellers 44 which are turned by the turbulent air stream flowing from the narrowed air conduit 26. A rotatable turbine shaft 46 fixed to the body of the vehicle is attached to and rotates with the turbine propellers 44. After passing the turbine 28, wind overflow exits through the exit port 40 and back into the environment.

The wind propulsion power system 10 includes an alternator generator 48 having a rotor 50 attached to the rotatable turbine shaft 46 of the turbine 28 for rotation therewith. The rotor 50 includes field poles 52. The generator 48 further includes a stator 56 having conductors 58. The turbine shaft 46 rotates the rotor 50 at varying speeds causing the field poles 52 to move past the conductors 58. This causes electricity to flow and a voltage to develop at generator output terminals 60.

Battery power lines 62 connect generator output terminals 60 of the generator 48 to the at least one vehicle battery 16 to charge or recharge the battery 16 or for supplying power to vehicle systems. The vehicle also includes a grid output terminal connector 64 which is electronically connected at home grid output terminals 65 to the generator 48 to provide a port for supplying supplemental electricity to an electrical grid 66. The grid output terminal connector 64 includes a power inverter connector port 68. The system also includes a sine wave power inverter 70 to convert direct current power from the wind propulsion power system 10 to alternating current for use in the electrical grid 66. The electrical grid 66 may be for a home or other building such as a workplace building, office building or retail building.

The wind propulsion power system 100 (FIG. 3) in another embodiment may also be used in a fuel-less drone aircraft 112. The wind power system 100 charges the aircraft's batteries 116 with wind turbulence as it is aircraft 112 is flown providing a quiet, stealth operation and extended flight times. The drone aircraft embodiment would have many of the components discussed above with the exception of the gasoline powered engine. The location of an air intake duct 118 is preferably at the forward portion of the aircraft 112 and located behind a metal grill 120. The wind propulsion power system 100 in the drone aircraft 112 also preferably includes air filtration 122 and heating systems 130. Unlike solar power, the wind propulsion power system 100 can generate power at night and in cloudy weather. The system 100 is connectable to an electrical grid such as an airport's electrical grid to provide supplemental power to the airport in the same manner as that shown in FIG. 2.

If not otherwise stated herein, any and all patents, patent publications, articles and other printed publications discussed or mentioned herein are hereby incorporated by reference as if set forth in their entirety herein.

It should be appreciated that the apparatus and methods of the invention may be configured and conducted as appropriate for any context at hand. The embodiments described above are to be considered in all respects only as illustrative and not restrictive.

What is claimed is:

1. A supplemental wind propulsion power system for a vehicle having at least one battery, the system comprising:
   an air intake duct disposed on the vehicle for intercepting turbulent airflow created by the forward motion of the vehicle, wherein the air intake duct has an adjustable opening including louvered slats, wherein the louvered slats are adjustably operable between an open position and a closed position, wherein a change of degree of the louvered slats allows for fluctuations in the volume of air entering the air intake duct, and wherein the louvered slats are in a closed position when the at least one battery is fully charged;
   an air conduit connected to the air intake duct at one end of the air conduit for receiving airflow from the air intake duct and having an outlet at an end opposite the air intake duct;
   an air turbine disposed at the outlet of the air conduit, wherein the air turbine comprises:
   a rotatable turbine shaft, and
   turbine propellers mounted on the turbine shaft for rotation therewith and which are turned by the airflow from the narrowed air conduit;
   a generator, wherein the generator comprises:
   a stator having at least one conductor, and
   a rotor attached to the turbine shaft for rotation therewith, wherein the rotor has at least one field pole such that rotation of the turbine shaft causes the field poles to move past the conductors to produce electricity;
   generator output terminals for receiving electricity produced by the generator;
   at least one battery power line connected to the generator output terminals for transporting the electricity produced by the generator to the at least one battery of the vehicle;
   an air filtration system disposed at the entrance of the air intake duct for intercepting airborne debris and preventing the debris from entering the air intake duct and reaching the turbine;
   an air heating system disposed in at least one of the air intake duct and the air conduit for heating cold air before entering the turbine, wherein the air heating system comprises a thermostatically controlled manifold heater, thermostatically controlled heat coils, and at least one of manually operable battery electrodes and manually operable glow plugs;
   an exit port disposed in the air conduit for allowing water to escape before contacting the turbine; and
   at least one grid output terminal electronically connected to the generator to provide a port for supplying supplemental electricity to an external electrical grid for a building.

2. The system of claim 1, wherein the air intake duct is located behind a radiator grill of the vehicle.

3. The system of claim 1, wherein the at least one grid output terminal includes a sine wave power inverter to convert direct current power from the wind propulsion power system to alternating current for use in the electrical grid.

4. The system of claim 1, wherein the vehicle is an automobile.

5. The system of claim 1, wherein the vehicle is a drone aircraft.

6. A supplemental wind propulsion power system for retrofitting a vehicle having at least one battery, the system comprising:
   an air intake duct for intercepting turbulent airflow created by the forward motion of the vehicle, wherein the air intake duct has an adjustable opening including louvered slats, wherein the louvered slats are adjustably operable between an open position and a closed position, wherein a change of degree of the louvered slats allows for fluctuations in the volume of air entering the air intake duct, and wherein the louvered slats are in a closed position when the at least one battery is fully charged;
   an air conduit connected to the air intake duct at one end of the air conduit for receiving airflow from the air intake duct and having an outlet at an end opposite the air intake duct;
   an air turbine disposed at the outlet of the air conduit, wherein the air turbine comprises:

a rotatable turbine shaft, and
turbine propellers mounted on the turbine shaft for rotation therewith and which are turned by the airflow from the narrowed air conduit;
a generator, wherein the generator comprises:
a stator having at least one conductor, and
a rotor attached to the turbine shaft for rotation therewith, wherein the rotor has at least one field pole such that rotation of the turbine shaft causes the field poles to move past the conductors to produce electricity;
generator output terminals for receiving electricity produced by the generator;
at least one battery power line connected to the generator output terminals for transporting the electricity produced by the generator to the at least one battery of the vehicle;
an air filtration system disposed at the entrance of the air intake duct for intercepting airborne debris and preventing the debris from entering the air intake duct and reaching the turbine;
an air heating system disposed in at least one of the air intake duct and the air conduit for heating cold air before entering the turbine, wherein the air heating system comprises a thermostatically controlled manifold heater, thermostatically controlled heat coils, and at least one of manually operable battery electrodes and manually operable glow plugs;
an exit port disposed in the air conduit for allowing water to escape before contacting the turbine; and
at least one grid output terminal electronically connected to the generator to provide a port for supplying supplemental electricity to an external electrical grid for a building.

* * * * *